UNITED STATES PATENT OFFICE.

CHARLES H. BACH, OF BROOKS, MINNESOTA.

COMPOSITION FOR MATCHES AND STOPPERS.

No. 884,885.  Specification of Letters Patent.  Patented April 14, 1908.

Application filed June 5, 1906. Serial No. 320,338.

*To all whom it may concern:*

Be it known that I, CHARLES H. BACH, a citizen of the United States, residing at Brooks, in the county of Red Lake, State of Minnesota, have invented certain new and useful Improvements in Composition for Matches and Stoppers; and I do hereby declare the following to be a full, clear, and exact description of the invention, such as will enable others skilled in the art to which it appertains to make and use the same.

This invention has relation to a new composition of matter that is adapted for the manufacture of matches; and it is the object of the invention to provide the said new composition of matter "in bulk", and supply it in this form to manufacturers, to be made into matches or other articles to which it may be suited.

It is my purpose, also, to furnish the said new composition of matter in different modified conditions, where called for, that is in a condition having greater or less specific gravity in one of its ingredients.

The nature of the invention is embodied in a composition of matter composed of wood charcoal and macerated or ground fibrous material, forming pulp suitable for the manufacture of paper. These substances are completely intermixed so that they constitute to all intents and purposes a unitary substance consisting of from one-tenth to three-eighths of one part of wood charcoal to one part of pulp, for matches for common use, the proportions being varied in quantity as it may be desired to have the match burn slowly or quickly. Again, the charcoal may vary in specific gravity for the reasons stated, it being known that charcoal produced from hard woods is of different specific gravity and burns more slowly than that produced from soft woods, the latter having less specific gravity and burning much more freely than the former.

In addition to varying the proportions of charcoal and pulp and taking advantage of the differences in specific gravity of the constituent elements composing the substances that enter into my new composition of matter, I add to it various other substances as circumstances and conditions may demand to render it useful. For example, a binder, in the nature of a gum or resinous matter intermixed with the matter to cause the particles to adhere and speedily solidify to the extent of having them take permanent form, so that the composition can be wrought into matches as articles of manufacture.

As examples, if I propose to use my new composition of matter in the manufacture of friction matches, to which it is peculiarly fitted, I avail myself of the variation in specific gravity of wood charcoals and employ one-twentieth part of charcoal made from hard wood, one-tenth part made from soft wood and a whole part of pulp with a simple resinous binder that will keep the particles together when molded or pressed.

One great advantage arising from my new composition of matter is that when made into matches and the match is lighted it will burn slowly and is not easily extinguished.

What is claimed is—

A composition of matter for the manufacture of slow-burning match bodies consisting of pulverized hard-wood charcoal, and pulped fibrous material, in the proportions substantially as specified, completely intermixed, and combined with a resinous binder.

In testimony whereof, I affix my signature, in presence of two witnesses.

CHARLES H. BACH.

Witnesses:
 W. B. CHESHIRE,
 O. BOISSONEAN.